(12) United States Patent
Clough (10) Patent No.: US 10,329,698 B2
(45) Date of Patent: Jun. 25, 2019

(54) FLUOROPOLYMER FIBER COMPOSITE BUNDLE

(71) Applicant: W.L. GORE & ASSOCIATES, INC., Newark, DE (US)

(72) Inventor: Norman Ernest Clough, Landenberg, PA (US)

(73) Assignee: W. L. Gore & Associates, Inc., Newark, DE (US)

(*) Notice: Subject to any disclaimer, the term of this patent is extended or adjusted under 35 U.S.C. 154(b) by 490 days.

(21) Appl. No.: 15/150,199

(22) Filed: May 9, 2016

(65) Prior Publication Data
US 2016/0251785 A1 Sep. 1, 2016

Related U.S. Application Data

(60) Division of application No. 12/720,074, filed on Mar. 9, 2010, now Pat. No. 9,334,587, which is a
(Continued)

(51) Int. Cl.
*D04C 1/12* (2006.01)
*A01K 91/00* (2006.01)
(Continued)

(52) U.S. Cl.
CPC ............... *D04C 1/12* (2013.01); *A01K 91/00* (2013.01); *D02G 3/444* (2013.01); *D04C 1/02* (2013.01); *D07B 1/025* (2013.01); *D07B 2201/2014* (2013.01); *D07B 2201/2036* (2013.01); *D07B 2201/2041* (2013.01); *D07B 2205/205* (2013.01); *D07B 2205/2014* (2013.01);
(Continued)

(58) Field of Classification Search
CPC . D04C 1/02; D04C 1/12; D02G 3/444; D07B 1/025; A01K 91/00
See application file for complete search history.

(56) References Cited

U.S. PATENT DOCUMENTS

| | | |
|---|---|---|
| 3,026,669 A | 3/1962 | Stanton |
| 3,125,095 A | 3/1964 | Kaufman et al. |

(Continued)

FOREIGN PATENT DOCUMENTS

| | | |
|---|---|---|
| CA | 1054465 A | 5/1979 |
| DE | 1898831 U | 8/1964 |

(Continued)

OTHER PUBLICATIONS

ASTM International Standard Test Method for Wet and Dry Yarn-on-Yarn Abrasion Resistance, Current Edition approval Nov. 10, 2000, published Feb. 2001, Annual Book of ASTM Standards, vol. 07.01, pp. 1-8.

(Continued)

*Primary Examiner* — Shaun R Hurley
(74) *Attorney, Agent, or Firm* — Greenberg Traurig, LLP (57) ABSTRACT

A fishing line having (a) multiple UHMWPE fibers and (b) at least one fluoropolymer fiber comprising expanded polytetrafluoroethylene. Also, a method of making a braided fishing line comprising the steps, in order, of forming a braided fiber by braiding UHMWPE fibers with expanded polytetrafluoroethylene fibers; heating the braided fiber; stretching the braided fiber while still heated; and cooling the stretched braided fiber.

18 Claims, 3 Drawing Sheets

Related U.S. Application Data continuation-in-part of application No. 11/608,271, filed on Dec. 8, 2006, now abandoned, which is a division of application No. 11/056,074, filed on Feb. 11, 2005, now abandoned.

(51) Int. Cl.
  *D07B 1/02* (2006.01)
  *D02G 3/44* (2006.01)
  *D04C 1/02* (2006.01)

(52) U.S. Cl.
  CPC ............... *D07B 2205/2071* (2013.01); *D07B 2205/2096* (2013.01); *D10B 2321/0211* (2013.01); *D10B 2321/042* (2013.01)

(56) References Cited

U.S. PATENT DOCUMENTS

| | | | |
|---|---|---|---|
| 3,415,052 A | 12/1968 | Stanton | |
| 3,722,201 A | 3/1973 | Whalen | |
| 3,758,704 A | 9/1973 | Naud | |
| 3,844,195 A | 10/1974 | Rhodes et al. | |
| 3,882,667 A | 5/1975 | Barry | |
| 4,074,512 A | 2/1978 | Matt | |
| 4,375,779 A | 3/1983 | Fischer | |
| 4,624,097 A | 11/1986 | Wilcox | |
| 4,776,851 A | 10/1988 | Bruchman et al. | |
| 4,898,046 A | 2/1990 | Mancewicz et al. | |
| 5,049,155 A | 9/1991 | Bruchman et al. | |
| 5,060,466 A | 10/1991 | Matsuda et al. | |
| 5,061,561 A | 10/1991 | Katayama | |
| 5,101,190 A | 3/1992 | Bullock et al. | |
| 5,197,983 A | 3/1993 | Berman et al. | |
| 5,258,040 A | 11/1993 | Bruchman et al. | |
| 5,296,292 A | 3/1994 | Butters | |
| 5,314,446 A | 5/1994 | Hunter et al. | |
| 5,456,983 A | 10/1995 | Sassa | |
| 5,562,987 A | 10/1996 | Shimizu | |
| 5,636,551 A | 6/1997 | Davidson et al. | |
| 5,669,214 A | 9/1997 | Kopanakis | |
| 5,692,530 A | 12/1997 | Bible et al. | |
| 5,706,382 A | 1/1998 | Smith | |
| 5,738,940 A | 4/1998 | Neuert | |
| 5,749,214 A | 5/1998 | Cook | |
| 5,802,828 A | 9/1998 | Adorno | |
| 5,920,671 A | 7/1999 | Smith | |
| 6,010,788 A | 1/2000 | Kebabjian et al. | |
| 6,020,276 A | 2/2000 | Hoyes et al. | |
| 6,117,547 A | 9/2000 | Kelmartin, Jr. et al. | |
| 6,132,866 A | 10/2000 | Nelson et al. | |
| 6,133,165 A | 10/2000 | Tamaru et al. | |
| 6,148,597 A | 11/2000 | Cook | |
| 6,167,650 B1 | 1/2001 | Duback | |
| 6,424,768 B1 | 7/2002 | Booth et al. | |
| 6,479,143 B1 | 11/2002 | Tamaru et al. | |
| 6,506,491 B2 | 1/2003 | Nelson et al. | |
| 6,528,709 B2 | 3/2003 | Hebestreit et al. | |
| 6,640,533 B2 | 11/2003 | Bertini et al. | |
| 6,667,097 B2 | 12/2003 | Tokarsky et al. | |
| 6,724,282 B2 | 4/2004 | Kao | |
| 6,919,130 B2 | 7/2005 | Tokarsky et al. | |
| 7,134,267 B1 | 11/2006 | Gilmore et al. | |
| 7,296,394 B2 | 11/2007 | Clough et al. | |
| 7,409,815 B2 | 8/2008 | Clough et al. | |
| 8,181,438 B2 | 5/2012 | Cook et al. | |
| RE45,778 E | 10/2015 | Cook et al. | |
| 9,334,587 B2 * | 5/2016 | Clough | ............... A01K 91/00 |
| 2002/0106956 A1 | 8/2002 | Howland | |
| 2002/0155287 A1 | 10/2002 | Nelson et al. | |
| 2003/0070413 A1 | 4/2003 | Fujiwara et al. | |
| 2003/0196676 A1 | 10/2003 | Baillie et al. | |
| 2003/0226347 A1 | 12/2003 | Smith et al. | |
| 2004/0069132 A1 | 4/2004 | Knudsen et al. | |
| 2004/0175567 A1 | 9/2004 | Huang et al. | |
| 2004/0194444 A1 | 10/2004 | Vinod et al. | |
| 2006/0179812 A1 | 8/2006 | Clough et al. | |
| 2006/0182962 A1 | 8/2006 | Bucher et al. | |
| 2007/0062174 A1 | 3/2007 | Clough et al. | |
| 2007/0079695 A1 | 4/2007 | Bucher et al. | |
| 2011/0020645 A1 | 1/2011 | Nakanishi | |

FOREIGN PATENT DOCUMENTS

| | | |
|---|---|---|
| EP | 0557894 A1 | 9/1993 |
| EP | 0785302 A1 | 7/1997 |
| GB | 1034328 A | 6/1966 |
| JP | 1-139833 A | 6/1989 |
| JP | 6-218081 A | 8/1994 |
| JP | 08-140538 A | 6/1996 |
| JP | 2954925 B1 | 7/1999 |
| JP | 11-313589 A | 11/1999 |
| JP | 2002-054041 A | 2/2002 |
| JP | 2007-135500 A | 6/2007 |
| JP | 2009-254245 A | 11/2009 |
| WO | WO-99/11355 A1 | 3/1999 |
| WO | WO-03/064760 A2 | 8/2003 |
| WO | WO-2005/001177 A1 | 1/2005 |
| WO | WO-2006/086338 A2 | 8/2006 |

OTHER PUBLICATIONS

Extended European Search Report for Application No. 06720391.9 dated Feb. 10, 2011.
International Seach Report, PCT/US2011/024962 dated Nov. 18, 2011.
M. J. Neale, C8 Frictional properties of materials, published 1973, Tribology Handbook.
Norman Clough, "Introducing a New Family of GORETM ePTFE Fibers" (2007) (retrieved May 13, 2015) [http://www.cee-environmental.com/public/data/companyCatalogue1232315262.pdf].
Supplementary European Search Report for Application No. 11753765 dated May 28, 2014.
U.S. Appl. No. 14/010,165, Declaration of Joe Meyer, Jun. 4, 2014.

* cited by examiner

FLUOROPOLYMER FIBER COMPOSITE BUNDLE

REFERENCE TO RELATED APPLICATION

This application is a divisional of U.S. application Ser. No. 12/720,074, filed Mar. 9, 2010; which is a continuation in part of U.S. application Ser. No. 11/608,271, filed Dec. 8, 2006, which is abandoned; which is a divisional of U.S. application Ser. No. 11/056,074, filed Feb. 11, 2005, which is abandoned; which applications are incorporated here by reference in their entirety.

FIELD OF THE INVENTION

The present invention relates to a fluoropolymer composite bundle and, more particularly, to fishing line made of composite bundles including fluoropolymers such as polytetrafluoroethylene (PTFE).

DEFINITION OF TERMS

Figure 1:
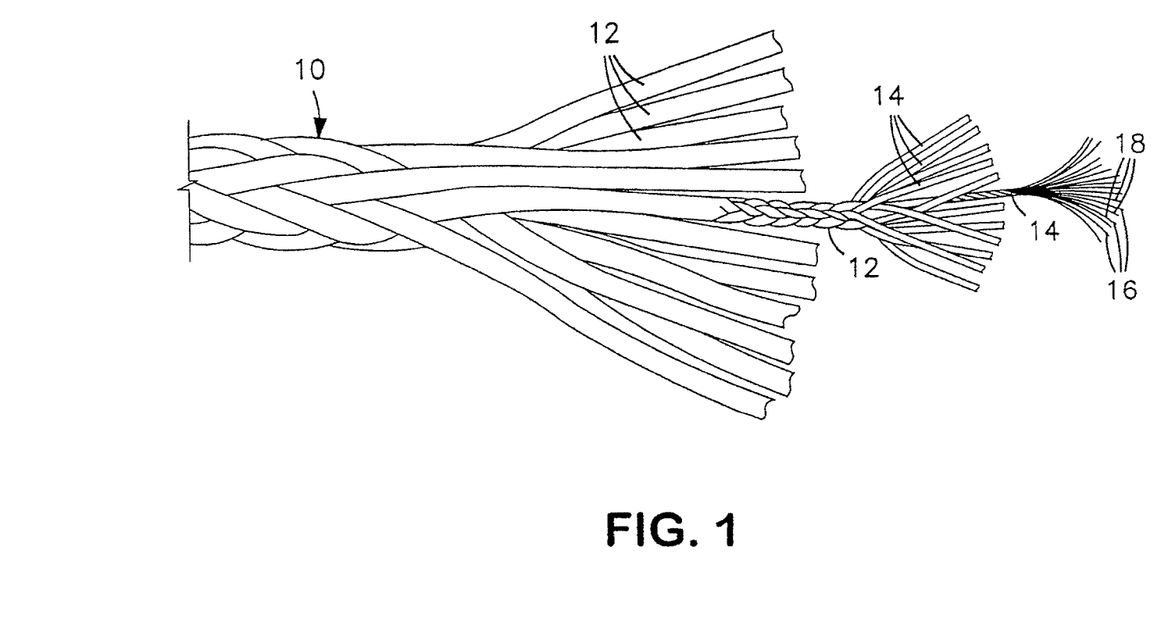
FIG. 1 is an exploded view of an exemplary embodiment of a rope made according to the present invention.

As used in this application, the term "fiber" means a threadlike article as indicated at 16 and 18 of FIG. 1. Fiber as used herein includes monofilament fiber and multifilament fiber. A plurality of fibers may be combined to form a "bundle" 14 as shown in FIG. 1. When different types of fibers are combined to form a bundle, it is referred to herein as a "composite bundle." A plurality of bundles may be combined to form a "bundle group" 12 as shown in FIG. 1. A plurality of bundle groups may be combined to form a "rope" 10 as shown in FIG. 1 (although alternative rope constructions are contemplated and included in this invention as described herein).

"Repeated stress applications" as used herein means those applications in which fibers are subjected to tensile, bending, or torsional forces, or combinations thereof, that result in abrasion and/or compression failures of the fiber, such as in ropes for mooring and heavy lifting applications, including, for instance, oceanographic, marine, and offshore drilling applications, and in ropes which are bent under tension against a pulley, drum, or sheave.

"High strength fiber" as used herein refers to a fiber having a tenacity of greater than 15 g/d.

"Abrasion rate" as used herein means the quotient of the decrease in the break force of a sample and the number of abrasion test cycles (as further defined in Example 1).

"Ratio of break strengths after abrasion test" as used herein means the quotient of the break strength after the abrasion test for a given test article that includes the addition of fluoropolymer fibers and the break strength after the abrasion test for the same construction of the test article without the addition of the fluoropolymer fibers.

"Low density" as used herein means density less than about 1 g/cc.

BACKGROUND OF THE INVENTION

High-strength fibers are used in many applications. For example, polymeric ropes are widely used in mooring and heavy lifting applications, including, for instance, oceanographic, marine, and offshore drilling applications. They are subjected to high tensile and bending stresses in use as well as a wide range of environmental challenges. These ropes are constructed in a variety of ways from various fiber types. For example, the ropes may be braided ropes, wire-lay ropes, or parallel strand ropes. Braided ropes are formed by braiding or plaiting bundle groups together as opposed to twisting them together. Wire-lay ropes are made in a similar manner as wire ropes, where each layer of twisted bundles is generally wound (laid) in the same direction about the center axis. Parallel strand ropes are an assemblage of bundle groups held together by a braided or extruded jacket.

Component fibers in ropes used in mooring and heavy lifting applications include high modulus and high strength fibers such as ultra high molecular weight polyethylene (UHMWPE) fibers. DYNEEMA® and SPECTRA® brand fibers are examples of such fibers. Liquid crystal polymer (LCP) fibers such as liquid crystal aromatic polyester sold under the tradename VECTRAN® are also used to construct such ropes. Para-aramid fibers, such as Kevlar® fiber, likewise, also have utility in such applications.

The service life of these ropes is compromised by one or more of three mechanisms. Fiber abrasion is one of the mechanisms. This abrasion could, be fiber-to-fiber abrasion internally or external abrasion of the fibers against another object. The abrasion damages the fibers, thereby decreasing the life of the rope. LCP fibers are particularly susceptible to this failure mechanism. A second mechanism is another consequence of abrasion. As rope fibers abrade each other during use, such as when the rope is bent under tension against a pulley or drum, heat is generated. This internal heat severely weakens the fibers. The fibers are seen to exhibit accelerated elongation rates or to break (i.e., creep rupture) under load. The UHMWPE fibers suffer from this mode of failure. Another mechanism is a consequence of compression of the rope or parts of the rope where the rope is pulled taught over a pulley, drum, or other object.

Various solutions to address these problems have been explored. These attempts typically involve fiber material changes or construction changes. The use of new and stronger fibers is often examined as a way to improve rope life. One solution involves the utilization of multiple types of fibers in new configurations. That is, two or more types of fibers are combined to create a rope. The different type fibers can be combined in a specific manner so as to compensate for the shortcoming of each fiber type. An example of where a combination of two or more fibers can provide property benefits are improved resistance to creep and creep rupture (unlike a 100% UHMWPE rope) and improved resistance to self-abrasion (unlike a 100% LCP rope). All such ropes, however, still perform inadequately in some applications, failing due to one or more of the three above-mentioned mechanisms.

Rope performance is determined to a large extent by the design of the most fundamental building block used to construct the rope, the bundle of fibers. This bundle may include different types of fibers. Improving bundle life generally improves the life of the rope. The bundles have value in applications less demanding than the heavy-duty ropes described above. Such applications include lifting, bundling, securing, and the like. Attempts have been made to combine fiber materials in such repeated stress applications. For example, UHMWPE fibers and high strength fibers, such as LCP fibers, have been blended to create a large diameter rope with better abrasion resistance, but they are still not as effective as desired.

The abrasion resistance of ropes for elevators has been improved by utilizing high modulus synthetic fibers, impregnating one or more of the bundles with polytetrafluoroethylene (PTFE) dispersion, or coating the fibers with PTFE powder. Typically such coatings wear off relatively quickly. Providing a jacket to the exterior of a rope or the individual bundles has also been shown to improve the rope life. Jackets add weight, bulk, and stiffness to the rope, however.

Fiberglass and PTFE have been commingled in order to extend the life of fiberglass fibers. These fibers have been woven into fabrics. The resultant articles possess superior flex life and abrasion resistance compared to fiberglass fibers alone. Heat-meltable fluorine-containing resins have been combined with fibers, in particular with cotton-like material fibers. The resultant fiber has been used to create improved fabrics: PTFE fibers have been used in combination with other fibers in dental floss and other low-load applications, but not in repeated stress applications described herein.

In sum, none of the known attempts to improve the life of ropes or cable have provided sufficient durability in applications involving both bending and high tension. The ideal solution would benefit both heavy-duty ropes and smaller diameter configurations, such as bundles. An improved fishing line is also desirable.

SUMMARY OF THE INVENTION

The present invention provides a composite bundle for repeated stress applications comprising at least one high strength fiber, and at least one fluoropolymer fiber, wherein the fluoropolymer fiber is present in an amount of about 40% by weight or less.

In a preferred embodiment, the high strength fiber is liquid crystal polymer or ultrahigh molecular weight polyethylene, or combinations thereof.

Preferred weight percentages of the fluoropolymer fiber are about 35% by weight or less, about 30% by weight or less, about 25% by weight or less, about 20% by weight or less, about 15% by weight or less, about 10% by weight or less, and about 5% by weight or less.

Preferably, the composite bundle has a ratio of break strengths after abrasion test of at least 1.8, even more preferably of at least 3.8, and even more preferably of at least 4.0. Preferably, the fluoropolymer fiber is an ePTFE fiber, which may be a monofilament or multifilament, either of which can be low or high density.

In alternative embodiments, the fluoropolymer fiber comprises a filler such as molybdenum disulfide, graphite, or lubricant (hydrocarbon, or silicone base fluid).

In alternative embodiments, the high strength fiber is para-aramid, liquid crystal polyester, polybenzoxazole (PBO), high tenacity metal, high tenacity mineral, or carbon fiber.

In another aspect, the invention provides for a method of reducing abrasion- or friction-related wear of a fiber bundle in repeated stress applications while substantially maintaining the strength of the fiber bundle comprising the step of including in the fiber bundle at least one filament of fluoropolymer.

In other aspects, the invention provides a rope, belt, net, sling, cable, woven fabric, nonwoven fabric, or tubular textile made from the inventive composite bundle.

In another aspect, the invention provides a fishing line having multiple UHMWPE fibers and at least one expanded polytetrafluoroethylene fiber. The fluoropolymer fiber is present in an amount of between about 10 and 30 percent by weight, preferably between about 12.5 and 25 percent. The fishing line has a break force subsequent to abrasion testing of at least 49 percent of the break force prior to abrasion testing, preferably at least 50 percent, and most preferably at least 60 percent. The ratio of the number of fluoropolymer fibers to the total number of fibers in the fishing line is between about 10 and 30 percent, preferably 12.5 and 25 percent (i.e., 1:8 and 1:4, respectively). The fishing line has a tenacity of at least about 10 g/d, preferably at least about 15 g/d, and most preferably at least about 20 g/d. The fishing line has a break force of at least about 13 kg subsequent to abrasion testing, preferably at least 14.5 kg, most preferably at least about 16 kg.

DETAILED DESCRIPTION OF THE INVENTION

The inventors have discovered that a relatively small weight percent of a fluoropolymer fiber added to a bundle of high strength fibers produces a surprisingly dramatic increase in abrasion resistance and wear life.

The high-strength fibers used to form ropes, cables, and other tensile members for use in repeated stress applications include ultra high molecular weight polyethylene (UHMWPE) such as DYNEEMA® and SPECTRA® brand fibers, liquid crystal polymer (LCP) fibers such as those sold under the tradename VECTRAN®, other LCAPs, PBO, high performance aramid fibers, para-aramid fibers such as Kevlar® fiber, carbon fiber, nylon, and steel. Combinations of such fibers are also included, such as UHMWPE and LCP, which is typically used for ropes in oceanographic and other heavy lifting applications.

The fluoropolymer fibers used in combination with any of the above fibers according to preferred embodiments of the present invention include, but are not limited to, polytetrafluoroethylene (PTFE) (including expanded PTFE (ePTFE) and modified PTFE), fluorinated ethylenepropylene (FEP), ethylene-chlorotrif-luoroethylene (ECTFE), ethylene-tetrafluoroethylene (ETFE), or perfluoroalkoxy polymer (PFA). The fluoropolymer fibers include monofilament fibers, multifilament fibers, or both. Both high and low density fluoropolymer fibers may be used in this invention.

Although the fluoropolymer fiber typically has less strength than the high-strength fiber, the overall strength of the combined bundle is not significantly compromised by the addition of the fluoropolymer fiber or fibers (or replacement of the high strength fibers with the fluoropolymer fiber or fibers). Preferably, less than 10% strength reduction is observed after inclusion of the fluoropolymer fibers.

The fluoropolymer fibers are preferably combined with the high-strength fibers in an amount such that less than about 40% by weight of fluoropolymer fiber are present in the composite bundle. More preferable ranges include less than about 35% less than about 30%, less than about 25%, less than about 20%, less than about 15%, less than about 10%, less than about 5%, and about 1%.

Surprisingly, even at these low addition levels, and with only a moderate (less than about 10%) reduction in strength, the composite bundles of the present invention show a dramatic increase in abrasion resistance and thus in wear life. In some cases, the ratio of break strengths after abrasion tests has exceeded 4.0, as illustrated by the examples presented below (See Table 3). Specifically, as demonstrated in Examples 1-4 below, the break force of a fiber bundle including PTFE and a high-strength fiber after a given number of abrasion testing cycles are dramatically higher than that of the high-strength fiber alone. The abrasion rates, therefore, are lower for PTFE fiber-containing composite bundles than for the same constructions devoid of PTFE fibers.

Without being limited by theory, it is believed that it is the lubricity of the fluoropolymer fibers that results in the improved abrasion resistance of the composite bundles. In this aspect, the invention provides a method of lubricating a rope or fiber bundle by including a solid lubricous fiber to it.

The fluoropolymer fibers optionally include fillers. Solid lubricants such as graphite, waxes, or even fluid lubricants like hydrocarbon oils or silicone oils may be used. Such fillers impart additional favorable properties to the fluoropolymer fibers and ultimately to the rope itself. For example, PTFE filled with carbon has improved thermal conductivity and is useful to improve the heat resistance of the fiber and rope. This prevents or at least retards the build-up of heat in the rope, which is one of the contributing factors to rope failure. Graphite or other lubricious fillers may be used to enhance the lubrication benefits realized by adding the fluoropolymer fibers.

Any conventionally known method may be used to combine the fluoropolymer fibers with the high-strength fibers. No special processing is required. The fibers may be blended, twisted, braided, or simply co-processed together with no special combination processing. Typically the fibers are combined using conventional rope manufacturing processes known to those skilled in the art.

By replacing UHMWPE strands in a fishing line with one or more ePTFE fibers, a fishing line of the present invention exhibits significantly improved durability compared to all UHMWPE fishing lines constructed in the same way. Preferably, the amount of ePTFE fibers to the total number of fibers in the braided fishing line is optimized to provide maximum abrasion resistance while minimizing the decrease in tenacity. For instance, in the construction of an 8 fiber braid, it is typically preferable to incorporate one or two ePTFE fibers. Higher pick counts are preferred in the construction of the fishing line.

Both the inventive and comparative braided fishing lines were subjected to a heated stretching step in order to improve the roundness and fiber to fiber adhesion of the lines. Abrasion tests were performed by tensioning the lines over a metal target possessing a 90 degree angle in order to simulate the abrasion caused in use by tensioned fishing lines rubbing against fishing pole ferules and abrasion against rocks and other objects, when in use.

EXAMPLES

In the examples presented below, abrasion resistance and wear life are tested on various fiber bundles. The results are indicative of the effects seen in ropes constructed from the bundles of the present invention, as will be appreciated by those skilled in the art.

Specifically, abrasion rate is used to demonstrate abrasion resistance. The wear life is demonstrated by certain examples in which the fiber bundles (with and without the inventive combination of fluoropolymer fibers) are cycled to failure. The results are reported as cycles to failure. More detail of the tests is provided below.

Testing Methods

Mass Per Unit Length and Tensile Strength Measurements

The weight per unit length of each individual fiber was determined by weighing a 9 m length sample of the fiber using a Denver Instruments. Inc. Model AA160 analytical balance and multiplying the mass, expressed in grams, by 1000 thereby expressing results in the units of denier. With the exception of Examples 6a and 6b, all tensile testing was conducted at ambient temperature on a tensile test machine (Zellweger USTER® TENSORAPID 4, Uster, Switzerland) equipped with pneumatic fiber grips, utilizing a gauge length of 350 mm and a cross-head speed of 330 mm/min. The strain rate, therefore, was 94.3%/min. For Examples 6a and 6b, tensile testing was conducted at ambient temperature on an INSTRON 5567 tensile test machine (Canton, Mass.) equipped with pneumatic horseshoe fiber grips, again utilizing a gauge length of 350 mm, a cross-head speed of 330 mm/min and, hence, a strain rate of 94.3%/min. The peak force, which refers to the break strength of the fiber, was recorded. Four samples were tested and their average break strength was calculated. The average tenacity of the individual fiber sample expressed in g/d was calculated by dividing the average break strength expressed in grams by the denier value of the individual fiber. In the case of testing composite bundles or bundle groups, the average tenacity of these samples was calculated by dividing the average break strength of the composite bundle or bundle group (in units of grams), by the weight per length value of the composite bundle or bundle group (expressed in units of denier). The denier value of the composite bundle or bundle group can be determined by measuring the mass of the sample or by summing the denier values of the individual components of the sample.

Density Measurement

Fiber density was determined using the following technique. The fiber volume was calculated from the average thickness and width values of a fixed length of fiber and the density calculated from the fiber volume and mass of the fiber. A 2-meter length of fiber was placed on an A&D FR-300 balance and the mass noted in grams (C). The thickness of the fiber sample was then measured at 3 points along the fiber using an AMES (Waltham, Mass., USA) Model LG3600 thickness gauge. The width of the fiber was also measured at 3 points along the same fiber sample using an LP-6 Profile Projector available from Ehrenreich Photo Optical Ind. Inc. Garden City, N.Y. Average values of thickness and width were then calculated and the volume of the fiber sample was determined (D). The density of the fiber sample was calculated as follows:

$$\text{fiber sample density (g/cc)} = C/D.$$

Abrasion Resistance Measurement

The abrasion test was adapted from ASTM Standard Test Method for Wet and Dry Yarn-on-Yarn Abrasion Resistance (Designation D 6611-00). This test method applies to the testing of yarns used in the construction of ropes, in particular, in ropes intended for use in marine environments.

Figure 2:
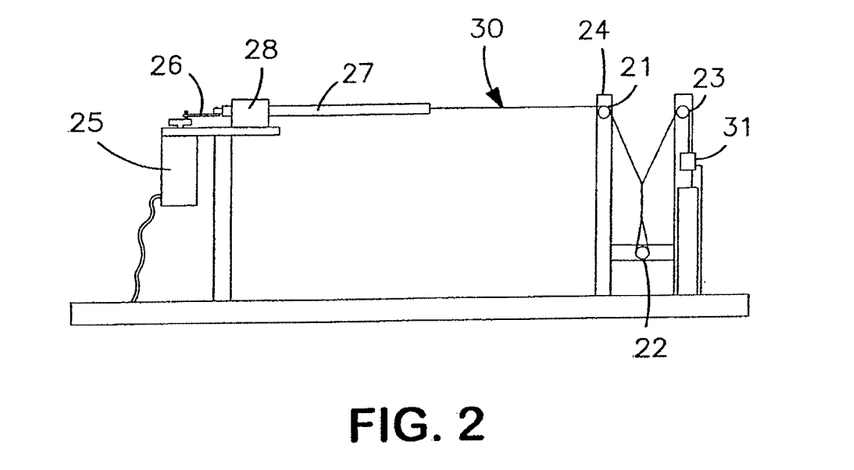
FIG. 2 is an illustration of an abrasion resistance test set-up.

The test apparatus is shown in FIG. 2 with three pulleys 21, 22, 23 arranged on a vertical frame 24. Pulleys 21, 22, 23 were 22.5 mm in diameter. The centerlines of upper pulleys 21, 23 were separated by a distance of 140 mm. The centerline of the lower pulley 22 was 254 mm below a horizontal line connecting the upper pulley 21, 23 centerlines. A motor 25 and crank 26 were positioned as indicated in FIG. 2. An extension rod 27 driven by the motor-driven crank 26 through a bushing 28 was employed to displace the test sample 30 a distance of 50.8 mm as the rod 27 moved forward and back during each cycle. A cycle comprised a forward and back stroke. A digital counter (not shown)

recorded the number of cycles. The crank speed was adjustable within the range of 65 and 100 cycles per minute.

A weight 31 (in the form of a plastic container into which various weights could be added) was tied to one end of sample 30 in order to apply a prescribed tension corresponding to 1.5% of the average break strength of the test sample 30. The sample 30, while under no tension, was threaded over the third pulley 23, under the second pulley 22, and then over the first pulley 21, in accordance with FIG. 2. Tension was then applied to the sample 30 by hanging the weight 31 as shown in the figure. The other end of the sample 30 was then affixed to the extension rod 27 attached to the motor crank 26. The rod 27 had previously been positioned to the highest point of the stroke, thereby ensuring that the weight 31 providing the tension was positioned at the maximum height prior to testing. The maximum height was typically 6-8 cm below the centerline of the third pulley 23. Care was taken to ensure that the fiber sample 30 was securely attached to the extension rod 27 and weight 31 in order to prevent slippage during testing.

Figure 3:
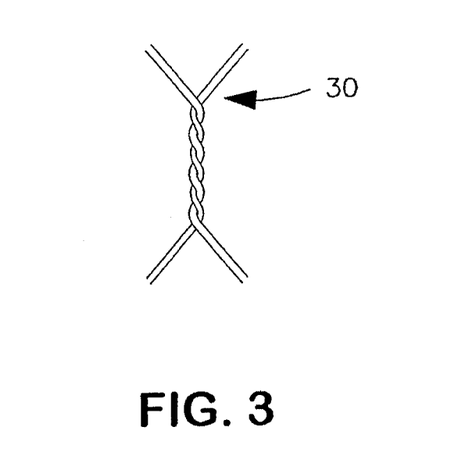
FIG. 3 is an illustration of a fiber sample twisted upon itself as used in the abrasion resistance test.

The test sample 30 while still under tension was then carefully removed from the second, lower, pulley 22. A cylinder (not shown) of approximately 27 mm diameter was placed in the cradle formed by the sample 30 and then turned 180° to the right in order to effect a half-wrap to the sample 30. The cylinder was turned an additional 180° to the right to complete a full 360° wrap. The twisting was continued in 180° increments until the desired number of wraps was achieved. The cylinder was then carefully removed while the sample 30 was still under tension and the sample 30 was replaced around the second pulley 22. By way of example, three complete wraps (3×360°) for a fiber sample 30 is shown in FIG. 3. The only deviation from the twist direction during wrapping would arise in the case of the sample being a twisted multifilament. In this case, the direction of this twist direction must be in the same direction as the inherent twist of the multifilament fiber.

In tests in which the test sample consists of two or more individual fibers, including at least one fiber of fluoropolymer, the following modified procedure was followed. After securing the test sample to the weight, the fluoropolymer fiber or fibers were placed side by side to the other fibers without twisting. Unless stated otherwise, the fluoropolymer fiber or fibers were always placed closest to the operator. The subsequent procedure for wrapping the fibers was otherwise identical to that outlined above.

Once the test setup was completed, the cycle counter was set to zero, the crank speed was adjusted to the desired speed, and the gear motor was started. After the desired number of cycles was completed, the gear motor was stopped and the abraded test sample was removed from the weight and the extension rod. Each test was performed four times.

The abraded test samples were then tensile tested for break strength and the results were averaged. The average tenacity was calculated using the average break strength value and the total weight per unit length value of the fiber or composite bundle sample.

In one example, the abrasion test continued until the fiber or composite bundle completely broke under the tension applied. The number of cycles were noted as the cycles to failure of the sample. In this example, three samples were tested and the average cycles to failure calculated.

Fishing Line Abrasion Test

The fishing line abrasion test was adapted from ASTM Standard Test Method for Wet and Dry Yarn-on-Yarn Abrasion Resistance (Designation D 6611-00). This test method applies to the testing of yarns used in the construction of ropes, in particular, in ropes intended for use in marine environments.

Figure 4:
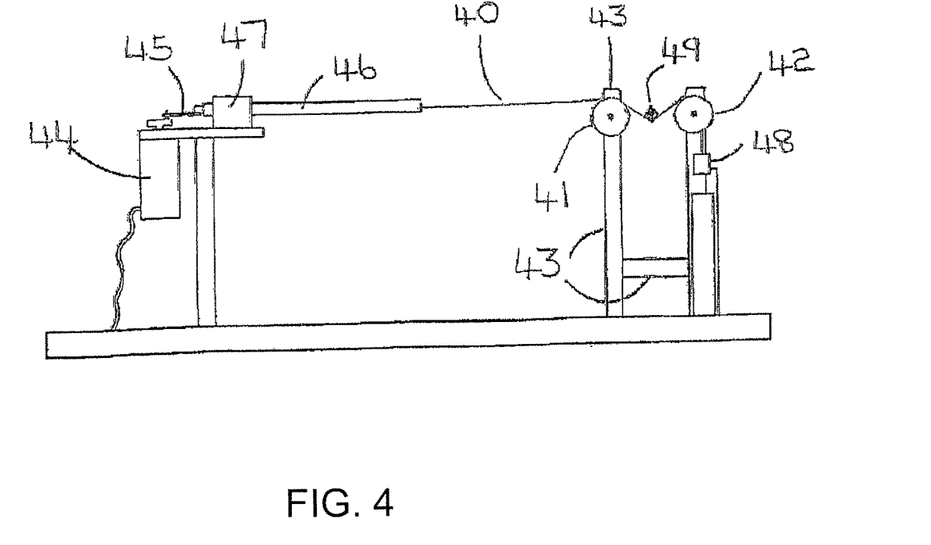
FIG. 4 is an illustration of a fishing line abrasion test set-up.

The test apparatus is shown in FIG. 4 with two 41, 42 pulleys arranged on a vertical frame 43. Pulleys 41, 42 were 45 mm in diameter. The centers of the pulleys 41, 42 were separated by a distance of 205 mm. A gear motor 44 and crank 45 were positioned as indicated in FIG. 4. An extension rod 46 driven by the motor-driven crank 45 through a bushing 47 was employed to displace the test sample 40 a distance of 50.8 mm as the rod 46 moved forward and back during each cycle. A cycle comprised a forward and back stroke. A digital counter (not shown) recorded the number of cycles. The crank speed was adjustable within the range of 65 and 100 cycles per minute.

A weight 48 (in the form of a plastic container into which various weights could be added) was tied to one end of sample 40 in order to apply a prescribed tension of 800 g. The sample 40, while under no tension, was threaded over the first pulley 41, under a blunt metal target 49, and over the second pulley 42, in accordance with FIG. 4. The blunt metal target 49 was a hardened steel corner machined at a 90 degree angle. The target 49 was positioned halfway between the pulleys 41, 42 and aligned such that the vertex of the target 49 extended 2.5 cm below the top of pulleys 41, 42. Tension was then applied to the sample 40 by hanging the weight 48 as shown in the figure. The other end of the sample 40 was then affixed to the extension rod 46 attached to the motor crank 45. The rod 46 had previously been positioned to the highest point of the stroke, thereby ensuring that the weight 40 providing the tension was positioned at the maximum height prior to testing. The maximum height was typically 6-8 cm below the center of the second pulley 42. Care was taken to ensure that the fiber sample 40 was securely attached to the extension rod 46 and weight 48 in order to prevent slippage during testing.

Once the test setup was completed, the cycle counter was set to zero, the crank speed was adjusted to the desired speed, and the gear motor 44 was started. After the desired number of cycles was completed, the gear motor 44 was stopped and the abraded test sample 40 was removed from the weight 48 and the extension rod 46. Each test was performed once. Tests were conducted for 2000 cycles.

The fishing line abrasion test samples were then tensile tested for break strength and the results were averaged, then reported. Tensile tests were performed using a crosshead speed of 200 mm/min and a jaw separation of 200 mm.

Example 1

A single ePTFE fiber was combined with a single liquid crystal polymer (LOP) fiber (Vectran®, Celanese Acetate LLC, Charlotte, N.C.) and subjected to the afore-mentioned abrasion test. The results from this test were compared against the results from the test of a single LCP fiber.

An ePTFE monofilament fiber was obtained (HT400d Rastex® fiber, W.L. Gore and Associates, Inc., Elkton Md.). This fiber possessed the following properties: 425 d weight per unit length, 2.29 kg break force, 5.38 g/d tenacity and 1.78 g/cc density. The LCP fiber had a weight per unit length of 1567 d, a 34.55 kg break force, and a tenacity of 22.0 g/d.

The two fiber types were combined by simply holding them so that they were adjacent to one another. That is, no twisting or other means of entangling was applied. The weight percentages of these two fibers when combined were 79% LCP and 21% ePTFE. The weight per unit length of the composite bundle was 1992 d. The break force of the composite bundle was 33.87 kg. The tenacity of the composite bundle was 17.0 g/d. Adding the single ePTFE fiber to the LCP changed the weight per unit length, break force, and tenacity by +27%, −2%, and −23%, respectively. Note that the decrease in break force associated with the addition of the ePTFE monofilament fiber was attributed to the variability of the strength of the fibers.

These fiber properties, as well as those of all the fibers used in Examples 2 through 8, are presented in Table 1.

A single LCP fiber was tested for abrasion resistance following the procedure described previously. Five complete wraps were applied to the fiber. The test was conducted at 100 cycles per minute, under 518 g tension (which corresponded to 1.5% of the break force of the LCP fiber).

The composite bundle of the single LCP fiber and the ePTFE monofilament fiber was also tested for abrasion resistance in the same manner. Five complete wraps were applied to the composite bundle. The test was conducted at 100 cycles per minute and under 508 g tension (which corresponded to 1.5% of the break force of the fiber combination).

The abrasion tests were run for 1500 cycles, after which point the test samples were tensile tested to determine their break force. The composite bundle and the LCP fiber exhibited 26.38 kg and 13.21 kg break forces after abrasion, respectively. Adding the single PTFE monofilament fiber to the single LCP fiber increased the post-abrasion break force by 100%. Thus, adding the single ePTFE monofilament fiber changed the break force by −2% prior to testing and resulted in a 100% higher break force upon completion of the abrasion test.

Decrease in break force was calculated by the quotient of break strength at the end of the abrasion test and the initial break strength. Abrasion rate was calculated as the quotient of the decrease in the break force of the sample and the number of abrasion test cycles. The abrasion rates for the LOP fiber alone and the composite of the LOP fiber and ePTFE monofilament fiber were 14.2 g/cycle and 5.0 g/cycle, respectively.

The test conditions and test results for this example as well as those for all of the other examples (Examples 2 through 8) appear in Tables 2 and 3, respectively.

Example 2A

A single ePTFE monofilament fiber was combined with a single ultra high molecular weight polyethylene (UHMWPE) fiber (Dyneema® fiber, DSM, Geleen, the Netherlands). Abrasion testing was performed as previously described. The composite bundle test results were compared to the results from the test of a single UHMWPE fiber.

An ePTFE monofilament fiber as made and described in Example 1 was obtained. The two fiber types were combined by simply holding them so that they were adjacent to one another. That is, no twisting or other means of entangling was applied. The weight percentages of these two fibers when combined were 79% UHMWPE and 21% ePTFE. The weights per unit length of the UHMWPE and the composite bundle were 1581 d and 2006 d, respectively. The break forces of the UHMWPE and the composite bundle were 50.80 kg and 51.67 kg, respectively. The tenacities of the UHMWPE and the composite bundle were 32.1 g/d and 25.7 g/d, respectively. Adding the ePTFE fiber to the UHMWPE fiber changed the weight per unit length, break force, and tenacity by +27%, +2%, and −20%, respectively.

A single UHMWPE fiber was tested for abrasion resistance following the procedure described previously. Three complete wraps were applied to the fiber. The test was conducted at 65 cycles per minute, under 762 g tension (which corresponded to 1.5% of the break force of the UHMWPE fiber).

The combination of the UHMWPE fiber and the ePTFE monofilament fiber was also tested for abrasion resistance in the same manner. Three complete wraps were applied to the combination of the fibers. The test was conducted at 65 cycles per minute and under 775 g tension (which corresponded to 1.5% of the break force of the fiber combination).

The abrasion tests were run for 500 cycles, after which point the test samples were tensile tested to determine their break force. The composite bundle and the UHMWPE fiber exhibited 42.29 kg and 10.90 kg break forces after abrasion, respectively. Adding the ePTFE monofilament fiber to the UHMWPE fiber increased the post-abrasion break force by 288%. Thus, adding the single ePTFE fiber increased the break force by 2% prior to testing and resulted in a 288% higher break force upon completion of the abrasion test. The abrasion rates for the UHMWPE fiber alone and the composite of the UHMWPE fiber and the ePTFE monofilament fiber were 79.8 g/cycle and 18.8 g/cycle, respectively.

Example 2B

A combination of an ePTFE fiber and an UHMWPE fiber was created and tested as described in Example 2a, except that in this case the ePTFE fiber was a multifilament fiber. A 400 d ePTFE monofilament fiber was towed using a pinwheel to create a multifilament ePTFE fiber. The multifilament fiber possessed the following properties: 405 d weight per unit length, 1.18 kg break force, 2.90 g/d tenacity and 0.72 g/cc density.

One multifilament ePTFE fiber was combined with one UHMWPE fiber as described in Example 2a. The properties and testing results for the UHMWPE fiber are presented in Example 2a. The composite bundle consisted of 80% UHMWPE by weight and 20% ePTFE by weight.

The weight per unit length of the composite bundle was 1986 d. The break force of the composite bundle was 50.35 kg. The tenacity of the composite bundle was 25.4 g/d. Adding the ePTFE fiber to the UHMWPE fiber changed the weight per unit length, break force, and tenacity by +26%, −1%, and −21%, respectively.

The combination of the UHMWPE fiber and the ePTFE multifilament fiber was tested for abrasion resistance under 755 g tension (which corresponded to 1.5% of the break force of the fiber combination) using three full wraps and 65 cycles/min as in Example 2a. The abrasion tests were again run for 500 cycles. The break force after abrasion for the composite ePTFE-UHMWPE bundle was 41.37 kg. Adding the ePTFE multifilament fiber to the UHMWPE fiber increased the post-abrasion break force by 280%. Thus, adding the single ePTFE fiber changed the break force by −1% prior to testing and resulted in a 280% higher break force upon completion of the abrasion test. The abrasion rate for the composite bundle was 18.0 g/cycle.

Example 3

An ePTFE monofilament fiber was combined with a twisted para-aramid fiber (Kevlar® fiber, E.I. DuPont deNemours, Inc., Wilmington, Del.) and subjected to the abrasion test. The results from this test were compared against the results from the test of a single para-aramid fiber.

The ePTFE monofilament fiber was the same as described in Example 1. The properties and testing results for the ePTFE monofilament fiber are presented in Example 1. The para-aramid fiber had a weight per unit length of 2027 d, a 40.36 kg break force, and a tenacity of 19.9 g/d.

The two fiber types were combined as described in Example 1 yielding a composite bundle comprised of 83% para-aramid by weight and 17% ePTFE monofilament by weight. The weight per unit length of the composite bundle was 2452 d. The break force of the composite bundle was 40.41 kg. The tenacity of the composite bundle was 16.7 g/d. Adding the single ePTFE fiber to the para-aramid changed the weight per unit length, break force, and tenacity by +21%, +0%, and −16%, respectively.

A single para-aramid fiber was tested for abrasion resistance following the procedure described previously. It should, be noted that due to the twist of the para-aramid fiber, the wrap direction was in the same direction as the inherent twist of the para-aramid fiber, which in this case was the reverse of the other examples. Three complete wraps were applied to the fiber. The test was conducted at 65 cycles per minute, under 605 g tension (which corresponded to 1.5% of the break force of the para-aramid fiber).

The combination of the para-aramid fiber and the ePTFE monofilament fiber was also tested for abrasion resistance in the same manner. Three complete wraps were applied to the combination of the fibers. The test was conducted at 65 cycles per minute and under 606 g tension (which corresponded to 1.5% of the break force of the fiber combination).

The abrasion tests were run for 400 cycles, after which point the test samples were tensile tested to determine their break force. The composite bundle and the para-aramid fiber exhibited 17.40 kg and 9.29 kg break forces after abrasion, respectively. Adding the ePTFE monofilament fiber to the para-aramid fiber increased the post-abrasion break force by 87%. Thus, adding the single ePTFE fiber increased the break force by 0% prior to testing and resulted in a 87% higher break force upon completion of the abrasion test. The abrasion rates for the para-aramid fiber alone and the composite of the para-aramid fiber and the ePTFE monofilament fiber were 77.7 g/cycle and 57.5 g/cycle, respectively.

Example 4

A single graphite-filled ePTFE fiber was combined with a single ultra high molecular weight polyethylene (UHMWPE) fiber (Dyneema® fiber) and subjected to the abrasion test. The results from this test were compared against the results from the test of a single UHMWPE fiber.

The graphite-filled ePTFE monofilament fiber was made in accordance with the teachings of U.S. Pat. No. 5,262,234 to Minor, et al. This fiber possessed the following properties: 475 d weight per unit length, 0.98 kg break force, 2.07 g/d tenacity and 0.94 g/cc density. The properties and testing results for the UHMWPE fiber are presented in Example 2a.

The two fiber types were combined in the same manner as in Example 1. The weight percentages of these two fibers when combined were 77% UHMWPE and 23% graphite-filled ePTFE. The weights per unit length of the UHMWPE and the composite bundle were 1581 d and 2056 d, respectively. The break force of the composite bundle was 49.35 kg. The tenacity of the composite bundle was 24.0 g/d. Adding the graphite-filled ePTFE fiber to the UHMWPE fiber changed the weight per unit length, break force, and tenacity by +30%, −3%, and −25%, respectively.

The combination of the UHMWPE fiber and the graphite-filled ePTFE monofilament fiber was tested for abrasion resistance. Three complete wraps were applied to the combination of the fibers. The test was conducted at 65 cycles per minute and under 740 g tension (which corresponded to 1.5% of the break force of the fiber combination). The abrasion testing results for the UHMWPE fiber are presented in Example 2a.

The abrasion tests were run for 500 cycles, after which point the test samples were tensile tested to determine their break force. The composite bundle exhibited a 36.73 kg break force after abrasion. Adding the graphite-filled monofilament ePTFE to the UHMWPE fiber increased the post-abrasion break force by 237%. Thus, adding the ePTFE monofilament fiber changed the break force by −3% prior to testing and resulted in a 237% higher break force upon completion of the abrasion test. The abrasion rates for the single UHMWPE fiber alone and the composite bundle of the single UHMWPE fiber and the single graphite-filled ePTFE monofilament fiber were 79.8 g/cycle and 25.2 g/cycle, respectively.

Example 5

Three different fiber types, UHMWPE, LOP, and ePTFE monofilament fibers, were combined to form a composite bundle. These fibers have the same properties as reported in examples 1 and 2a. The number of strands and weight percent of each fiber type were as follows: 1 and 40% for UHMWPE, 1 and 39% for LCP, and 2 and 21% for ePTFE monofilament.

Tensile and abrasion testing were performed for this composite bundle as well as a composite bundle comprising one strand each of the UHMWPE and LCP fibers. The weights per length, break forces, and tenacities for the 2-fiber type and 3-fiber type configurations were 3148 d and 3998 d, 73.64 kg and 75.09 kg, and 23.4 g/d and 18.8 g/d, respectively.

The abrasion test conditions were the same as previously described except that the test was not terminated when a certain number of cycles was reached, but rather once the sample failed and three (not four) tests were conducted for each configuration. The fibers were placed side-by-side in the abrasion tester in the following manner: the LCP fiber, a PTFE fiber, the UHMWPE fiber, a PTFE fiber with the LCP fiber positioned furthermost from the operator and the PTFE fiber positioned closest to the operator. Failure was defined as total breakage of the composite bundles. For the abrasion test, 4 complete wraps were applied to the composite bundle. The test was conducted at 65 cycles per minute. The applied tension was 1105 g for the composite of UHMWPE and LCP fibers only and was 1126 g for the composite of all three fiber types. The tension in both tests corresponded to 1.5% of the break force of the fiber combination.

The average cycles to failure was calculated from the three abrasion test results. Failure occurred at 1263 cycles for the composite bundle of UHMWPE and LCP fibers only and it occurred at 2761 cycles for the composite bundle of all three fiber types.

Adding the ePTFE monofilament fibers to the combination of one UHMWPE fiber and one LOP fiber changed the weight per unit length, break force, and tenacity by +27%, +2%, and −20%, respectively. The addition of the ePTFE fibers increased the cycles to failure by +119%.

Example 6

Two additional composite bundles were constructed using the methods and fibers as described in Example 2a. These two composite bundles were designed to have two different weight percentages of the ePTFE monofilament and UHMWPE fiber components.

6a)

A single ePTFE fiber was combined with three UHMWPE fibers and subjected to the abrasion test. The weight percentages of the ePTFE fiber and the UHMWPE fibers were 8% and 92%, respectively. The weights per unit length of the three UHMWPE fibers and of the composite bundle were 4743 d and 5168 d, respectively. The break forces of the three UHMWPE fibers and of the composite bundle were 124.44 kg and 120.63 kg, respectively. The tenacities of the three UHMWPE fibers and of the composite bundle were 26.2 g/d and 23.3 g/d, respectively. Adding the ePTFE fiber to the three UHMWPE fibers changed the weight per unit length, break force, and tenacity by +9%, −3%, and −11%, respectively.

For the abrasion test, 2 complete wraps were applied to the test samples. The tests were conducted at 65 cycles per minute and under 1867 g and 1810 g tension, respectively for the three UHMWPE fibers alone and the composite bundle of three UHMWPE fibers and single ePTFE fiber. (These tensions corresponded to 1.5% of the break force of the test samples).

The abrasion tests were conducted for 600 cycles, after which point the test samples were tensile tested to determine their break force. The composite bundle and the three UHMWPE fibers exhibited 99.07 kg and 23.90 kg break forces after abrasion, respectively. Thus, adding the single ePTFE fiber to the three UHMWPE fibers changed the break force by −3%% prior to testing and resulted in a 314% higher break force upon completion of the abrasion test. The abrasion rates for the composite of three UHMWPE fibers without and with the single ePTFE monofilament fiber were 167.6 g/cycle and 35.9 g/cycle, respectively.

6b)

Five ePTFE fibers were combined with three UHMWPE fibers and subjected to the abrasion test. The weight percentages of the ePTFE fibers and the UHMWPE fibers were 31% and 69%, respectively. The weights per unit length of the three UHMWPE fibers and of the composite bundle were 4743 d and 6868 d, respectively. The break forces of the three UHMWPE fibers and of the composite bundle were 124.44 kg and 122.53 kg, respectively. The tenacities of the three UHMWPE fibers and of the composite bundle were 26.2 g/d and 19.0 g/d, respectively. Adding five ePTFE fibers to the three UHMWPE fibers changed the weight per unit length, break force, and tenacity by +45%, −2%, and −27%, respectively.

For the abrasion test, 2 complete wraps were applied to the test samples. The tests were conducted at 65 cycles per minute and under 1867 g and 1838 g tension, respectively for the three UHMXPE fibers alone and the composite of three UHMWPE fibers and fives ePTFE fibers. (These tensions corresponded to 1.5% of the break force of the test samples.

The abrasion tests were conducted for 600 cycles, after which point the test samples were tensile tested to determine their break force. The composite bundle exhibited a 100.49 kg break force after abrasion. Thus, adding the five ePTFE fibers changed the break force by −2% prior to testing and resulted in a 320% higher break force upon completion of the abrasion test. The abrasion rates for the composite of three UHMWPE fibers without and with the five ePTFE monofilament fibers were 167.6 g/cycle and 36.7 g/cycle, respectively.

Example 7

Another composite bundle was constructed using the methods and the UHMWPE fiber as described in Example 2a. In this example a lower density ePTFE monofilament fiber was used. This fiber was produced in accordance with the teachings of U.S. Pat. No. 6,539,951 and possessed the following properties: 973 d weight per unit length, 2.22 kg break force, 2.29 g/d tenacity and 0.51 g/cc density.

Single fibers of both fiber types were combined as described in Example 2. The weight percentages of these two fibers when combined were 62% UHMWPE and 38% ePTFE. The weight per unit length of the composite bundle was 2554 d. The break force of the composite bundle was 49.26 kg. The tenacity of the composite bundle was 19.3 g/d. Adding the single PTFE fiber to the UHMWPE fiber changed the weight per unit length, break force, and tenacity by +62%, −3%, and −40%, respectively.

The test method and results of abrasion testing a single UHMWPE fiber were reported in Example 2a. The composite of the UHMWPE fiber and the low density ePTFE monofilament fiber was also tested for abrasion resistance in the same manner. Three complete wraps were applied to the composite bundle. The test was conducted at 65 cycles per minute and under 739 g tension (which corresponded to 1.5% of the break force of the fiber combination).

The abrasion tests were run for 500 cycles, after which point the test samples were tensile tested to determine their break force. The composite bundle and the UHMWPE fiber exhibited 44.26 kg and 10.9 kg break forces after abrasion, respectively. Thus, adding the single ePTFE fiber changed the break force by −3% prior to testing and resulted in a 306% higher break force upon completion of the abrasion test. The abrasion rates for the UHMWPE fiber alone and the composite bundle of the UHMWPE fiber and the low density ePTFE monofilament fiber were 79.80 g/cycle and 10.00 g/cycle, respectively.

Example 8

Another composite bundle was constructed using the methods and the UHMWPE fiber as described in Example 2. In this Example, matrix-spun PTFE multifilament fiber (E.I. DuPont deNemours, Inc., Wilmington, Del.) was used. This fiber possessed the following properties: 407 d weight per unit length, 0.64 kg break force, 1.59 g/d tenacity and 1.07 g/cc density.

Single fibers of both fiber types were combined as described in Example 2. The weight percentages of these two fibers when combined were 80% UHMWPE and 20% PTFE. The weight per unit length of the composite bundle was 1988 d. The break force of the composite bundle was 49.51 kg. The tenacity of the composite bundle was 24.9 g/d. Adding the single PTFE fiber to the UHMWPE fiber changed the weight per unit length, break force, and tenacity by +26%, −2%, and −22%, respectively.

The test method and results of abrasion testing a single UHMWPE fiber were reported in Example 2a. The composite bundle of the UHMWPE fiber and the PTFE multifilament fiber was also tested for abrasion resistance in the same manner. Three complete wraps were applied to the composite bundle. The test was conducted at 65 cycles per minute and under 743 g tension (which corresponded to 1.5% of the break force of the fiber combination).

The abrasion tests were run for 500 cycles, after which point the test samples were tensile tested to determine their break force. The composite bundle and the UHMWPE fiber exhibited 39.64 kg and 10.9 kg break forces after abrasion, respectively. Thus, adding the single PTFE fiber changed the break force by −2% prior to testing and resulted in a 264% higher break force upon completion of the abrasion test. The abrasion rates for the UHMWPE fiber alone and the composite bundle of the UHMWPE fiber and the PTFE multifilament fiber were 79.80 g/cycle and 19.74 g/cycle, respectively.

Example 9

Another composite bundle was constructed using the methods and the UHMWPE fiber as described in Example 2. In this Example, an ETFE (ethylene-tetrafluoroethylene) multifilament fluoropolymer fiber (available from E.I. DuPont deNemours, Inc., Wilmington, Del.) was used. This fiber possessed the following properties: 417 d weight per unit length, 1.10 kg break force, 2.64 g/d tenacity and 1.64 g/cc density.

Single fibers of both fiber types were combined as described in Example 2. The weight percentages of these two fibers when combined were 79% UHMWPE and 21% ETFE. The weight per unit length of the composite bundle was 1998 d. The break force of the composite bundle was 50.44 kg. The tenacity of the composite bundle was 25.2 g/d. Adding the single ETFE fiber to the UHMWPE changed the weight per unit length, break force, and tenacity by +26%, −1%, and −21%, respectively.

The test method and results of abrasion testing a single UHMWPE fiber were reported in Example 2a. The composite bundle of the UHMWPE fiber and the ETFE multifilament fluoropolymer fiber was also tested for abrasion resistance in the same manner. Three complete wraps were applied to the composite bundle. The test was conducted at 65 cycles per minute and under 757 g tension (which corresponded to 1.5% of the break force of the fiber combination).

The abrasion tests were run for 500 cycles, after which point the abraded test samples were tensile tested to determine their break force. The composite bundle and the UHMWPE fiber exhibited 27.87 kg and 10.9 kg break forces after abrasion, respectively. Thus, adding the single ETFE multifilament fiber changed the break force by −1% prior to testing and resulted in a 156% higher break force upon completion of the abrasion test. The abrasion rates for the UHMWPE fiber alone and the composite bundle of the UHMWPE fiber and the ETFE multifilament fiber were 79.80 g/cycle and 45.14 g/cycle, respectively.

In summary, the above examples demonstrate certain embodiments of the present invention, specifically:

Examples 1-3 demonstrate the combination of a single ePTFE fiber with a single fiber of each of the three major high strength fibers;

Example 2 also compares monofilament and multifilament ePTFE fibers.

Example 4 demonstrates the effect of combining a graphite-filled ePTFE monofilament fiber with a single UHMWPE fiber.

Example 5 demonstrates the performance of a three-fiber construction, as is used in making a rope; the abrasion test was conducted until failure.

Example 6 demonstrates the effects of varying the amount of monofilament ePTFE fiber in a two-fiber construction (varying the number of ePTFE fibers and combining them with three UHMWPE fibers).

Example 7 demonstrates the effect of using a lower density monofilament ePTFE fiber [to compare with Examples 2a-b and Examples 6a-b].

Example 8 demonstrates the effect of using a low tenacity, non-expanded PTFE fiber with a UHMWPE fiber.

Example 9 demonstrates the use of an alternative fluoropolymer.

These results are summarized in the following tables.

TABLE 1

|  | Example | | | | | |
|---|---|---|---|---|---|---|
|  | 1 | 2a | 2b | 3 | 4 | 5 |
| Fluoropolymer Component | ePTFE | ePTFE | ePTFE | ePTFE | ePTFE | ePTFE |
| fiber type | mono- | mono- | multi- | mono- | C-filled mono- | mono- |
| # of fibers | 1 | 1 | 1 | 1 | 1 | 2 |
| weight/length (d) | 425 | 425 | 405 | 425 | 475 | 425 |
| density (g/cc) | 1.78 | 1.78 | 0.72 | 1.78 | 0.94 | 1.78 |
| break force (kg) | 2.29 | 2.29 | 1.18 | 2.29 | 0.98 | 2.29 |
| tenacity (g/d) | 5.38 | 5.38 | 2.9 | 5.38 | 2.07 | 5.38 |
| weight percent (%) | 21 | 21 | 20 | 17 | 23 | 21 |
| Component 2 | | | | | | |
| Type | LCP | UHMWPE | UHMWPE | para-aramid | UHMWPE | LCP |
| # of fibers | 1 | 1 | 1 | 1 | 1 | 1 |
| weight/length (d) | 1567 | 1581 | 1581 | 2027 | 1581 | 1567 |
| break force (kg) | 34.55 | 50.8 | 50.8 | 40.36 | 50.8 | 34.55 |
| tenacity (g/d) | 22 | 32.1 | 32.1 | 19.9 | 32.1 | 22 |
| weight percent (%) | 79 | 79 | 80 | 83 | 77 | 39 |
| Component 3 | | | | | | |
| Type | x | x | x | x | x | UHMWPE |
| # of fibers | x | x | x | x | x | 1 |
| weight/length (d) | x | x | x | x | x | 1581 |
| break force (kg) | x | x | x | x | x | 50.8 |
| Tenacity (g/d) | x | x | x | x | x | 32.1 |
| weight percent (%) | x | x | x | x | x | 40 |

TABLE 1-continued

Composite

| weight/length (d) | 1992 | 2006 | 1986 | 2452 | 2056 | 3998 |
|---|---|---|---|---|---|---|
| break force (kg) | 33.87 | 51.67 | 50.35 | 40.41 | 49.35 | 75.09 |
| Tenacity (g/d) | 17 | 25.7 | 25.4 | 16.7 | 24 | 18.8 |

| | Example | | | | |
|---|---|---|---|---|---|
| | 6a | 6b | 7 | 8 | 9 |
| Fluoropolymer Component | ePTFE | ePTFE | ePTFE | matrix-spun PTFE | ETFE |
| fiber type | mono- | mono- | mono- | multi- | multi- |
| # of fibers | 1 | 5 | 1 | 1 | 1 |
| weight/length (d) | 425 | 425 | 973 | 407 | 417 |
| density (g/cc) | 1.78 | 1.78 | 0.51 | 1.07 | 1.64 |
| break force (kg) | 2.29 | 2.29 | 2.22 | 0.64 | 1.10 |
| tenacity (g/d) | 5.38 | 5.38 | 2.29 | 1.59 | 2.64 |
| weight percent (%) | 8 | 31 | 38 | 20 | 21 |
| Component 2 | | | | | |
| Type | UHMWPE | UHMWPE | UHMWPE | UHMWPE | UHMWPE |
| # of fibers | 3 | 3 | 1 | 1 | 1 |
| weight/length (d) | 4743 | 4743 | 1581 | 1581 | 1581 |
| break force (kg) | 124.44 | 124.44 | 50.8 | 50.8 | 50.8 |
| tenacity (g/d) | 26.2 | 26.2 | 32.1 | 32.1 | 32.1 |
| weight percent (%) | 92 | 69 | 62 | 80 | 79 |
| Component 3 | | | | | |
| Type | x | x | x | x | x |
| # of fibers | x | x | x | x | x |
| weight/length (d) | x | x | x | x | x |
| break force (kg) | x | x | x | x | x |
| Tenacity (g/d) | x | x | x | x | x |
| weight percent (%) | x | x | x | x | x |
| Composite | | | | | |
| weight/length (d) | 5168 | 6868 | 2554 | 1988 | 1998 |
| break force (kg) | 120.63 | 122.53 | 49.26 | 49.51 | 50.44 |
| Tenacity (g/d) | 23.3 | 19 | 19.3 | 24.9 | 25.2 |

TABLE 2

| Example | Composition (weight %, fiber type) | Construction (number of fibers) | rate (cycles/min) | tension (g) (1.5% of the break force) non-ePTFE component | tension (g) (1.5% of the break force) composite | number of twists | cycles |
|---|---|---|---|---|---|---|---|
| 1 | 21% monofilament ePTFE, 79% LCP | 1 PTFE/1 LCP | 100 | 518 | 508 | 5 | 1500 |
| 2a | 21% monofilament ePTFE, 79% UHMWPE | 1 PTFE/1 UHMWPE | 65 | 762 | 775 | 3 | 500 |
| 2b | 20% multifilament ePTFE, 80% UHMWPE | 1 PTFE/1 UHMWPE | 65 | 762 | 755 | 3 | 500 |
| 3 | 17% monofilament ePTFE, 83% para-aramid | 1 PTFE/1 para-aramid | 65 | 605 | 606 | 3 | 400 |
| 4 | 23% C-filled monofilament ePTFE, 77% UHMWPE | 1 PTFE/1 UHMWPE | 65 | 762 | 740 | 3 | 500 |
| 5 | 21% monofilament ePTFE, 39% LCP, 40% UHMWPE | 2 PTFE/1 LCP/1 UHMWPE | 65 | 1105 | 1126 | 4 | to failure |
| 6a | 8% monofilament ePTFE, 92% UHMWPE | 1 PTFE/3 UHMWPE | 65 | 1867 | 1810 | 2 | 600 |
| 6b | 31% monofilament ePTFE, 69% UHMWPE | 5 PTFE/3 UHMWPE | 65 | 1867 | 1838 | 2 | 600 |
| 7 | 38% low density monofilament ePTFE, 62% UHMWPE | 1 PTFE/1 UHMWPE | 65 | 762 | 739 | 3 | 500 |
| 8 | 20% matrix-spun PTFE, 80% UHMWPE | 1 PTFE/1 UHMWPE | 65 | 762 | 743 | 3 | 500 |
| 9 | 21% ETFE, 79% UHMWPE | 1 ETFE/1 UHMWPE | 65 | 762 | 757 | 3 | 500 |

TABLE 3

| Example | Composition (weight %, fiber type) | Break Strength after Abrasion Test (kg) | | Ratio of Break Strengths after Abrasion Test (inventive:prior art) | Abrasion Rate (g/cycle) | | Ratio of Abrasion Rates (prior art:inventive) |
|---|---|---|---|---|---|---|---|
| | | Inventive Article | Prior Art (no PTFE) | | Inventive Article | Prior Art (no PTFE) | |
| 1 | 21% monofilament ePTFE, 79% LCP | 26.38 | 13.21 | 2.00 | 5.00 | 14.20 | 2.84 |
| 2a | 21% monofilament ePTFE, 79% UHMWPE | 42.29 | 10.90 | 3.88 | 18.80 | 79.80 | 4.24 |
| 2b | 20% multifilament ePTFE, 80% UHMWPE | 41.37 | 10.90 | 3.80 | 18.00 | 79.80 | 4.43 |
| 3 | 17% monofilament ePTFE, 83% para-aramid | 17.40 | 9.29 | 1.87 | 57.50 | 77.70 | 1.35 |
| 4 | 23% C-filled monofilament ePTFE, 77% UHMWPE | 36.73 | 10.90 | 3.37 | 25.20 | 79.80 | 3.17 |
| 5 | 21% monofilament ePTFE, 39% LCP, 40% UHMWPE | n/a | n/a | n/a | n/a | n/a | n/a |
| 6a | 8% monofilament ePTFE, 92% UHMWPE | 99.07 | 23.90 | 4.14 | 35.90 | 167.60 | 4.67 |
| 6b | 31% monofilament ePTFE, 69% UHMWPE | 100.49 | 23.90 | 4.20 | 36.70 | 167.60 | 4.57 |
| 7 | 38% monofilament ePTFE, 62% UHMWPE | 44.26 | 10.90 | 4.06 | 10.00 | 79.80 | 7.98 |
| 8 | 20% matrix-spun PTFE, 80% UHMWPE | 39.64 | 10.90 | 3.64 | 19.74 | 79.80 | 4.04 |
| 9 | 21% ETFE, 79% UHMWPE | 27.87 | 10.90 | 2.56 | 45.14 | 79.80 | 1.77 |

Example 10

Inventive braided fibers suitable for use a fishing line were created. Expanded PTFE fiber (part #V112407, W.L. Gore & Associates, Inc., Elkton, Md.) was obtained. The fiber had the following properties: denier of 191 d and tenacity of 3.9 g/d. UHMWPE fiber was obtained (220/100-UHTPE, Textile Development Associates, Inc., Brookfield, Conn.) having a denier of 193 d and tenacity of 39.9 g/d. An 8 carrier braiding machine (Model FM/16R-CF available from Hacoba GmbH & Co. Hatzfelder Strasse 161-163, D-42281, Wuppertal, Germany) was obtained. The UHMWPE fiber and the ePTFE fiber were spooled onto six spools and two spools, respectively. The two spools of ePTFE fiber were positioned opposite each other. The fibers were braided having a pick count of 16.5 picks/cm. The resultant braided fiber was subsequently stretched following the general teachings of U.S. Pat. No. 6,148,597. The braided fiber was heated and stretched through a series of two identical infrared/hot air ovens of internal diameter 3.8 cm and 2.1 m in length to provide a total stretch ratio of about 1.8:1 in. The first oven was set to a temperature of between about 146-151 deg C. The braided fiber was stretched about 1.4:1 in this oven. The second oven was set to a temperature of about 149-152 deg C. The braided fiber was stretched about 1.29:1 in this oven. The output speed of the fiber exiting the second oven was about 6.1 m/min.

The resulting braided fibers were characterized prior to abrasion testing in accordance with the afore-mentioned test conditions with the following exceptions. The tensile strength measurements were made using a gage length of 200 mm and a cross-head speed of 200 mm/min, hence, a strain rate of 100%/min.

The following test results were obtained: denier of 1255 d, 25.4 kg break force and a tenacity of 20.2 g/d. The results of the fishing line abrasion test performed on a single braided fiber was 16.1 kg (break force subsequent to abrasion testing).

For the purpose of comparison, another braided fiber was made in the same manner as the ePTFE-containing fiber except that all 8 spools contained the UHMWPE fiber (that is, the two ePTFE fibers were replaced with two UHMWPE fibers in the braid).

The resulting all UHMWPE braided fibers were characterized prior to abrasion testing in the same manner as the afore-mentioned ePTFE-containing braided fiber.

The following test results were obtained: denier of 1292 d, 32.1 kg break force and a tenacity of 24.8 g/d. The results of the fishing line abrasion test performed on a single braided fiber was 11.8 kg (break force subsequent to abrasion testing).

Therefore, the inventive ePTFE-containing braided fibers had 21% lower break strength compared to the all UHMWPE fiber braided fiber. However, subsequent to the fishing line abrasion test, the inventive ePTFE-containing braided fibers had 37% higher break strength compared to the all UHMWPE fiber braided fiber. That is, although the starting strength of the inventive braided fiber was significantly lower than that of the all UHMWPE braided fiber, the break strength of the inventive braided fiber was significantly higher than the all UHMWPE braided fiber subsequent to 2000 cycles in the fishing line abrasion test.

While particular embodiments of the present invention have been illustrated and described herein, the present invention should not be limited to such illustrations and descriptions. It should be apparent that changes and modifications may be incorporated and embodied as part of the present invention within the scope of the following claims. In particular, although primarily presented in the exemplary embodiment of a rope for use in repeated stress applications, the inventive composite bundles also have applicability in other forms; for example, in belts, nets, slings, cables, woven fabrics, nonwoven fabrics, and tubular textiles.

The invention claimed is:

1. A method of making a braided fishing line comprising the steps, in order, of
   (a) forming a braid by braiding UHMWPE fibers with expanded polytetrafluoroethylene fibers;
   (b) heating said braid;
   (c) stretching said braid while still heated; and
   (d) cooling said stretched braid.

2. A method as defined in claim 1 wherein said expanded polytetrafluoroethylene fibers are present in an amount of between about 10% and 30% by weight.

3. A method as defined in claim 1 wherein said expanded polytetrafluoroethylene fibers are present in an amount of between about 12.5% and 25% by weight.

4. A method as defined in claim 1 wherein the braid comprises 8 fibers.

5. A method as defined in claim 4 wherein the braid comprises one expanded ePTFE fiber and seven UHMWPE fibers.

6. A method as defined in claim 4 wherein the braid comprises two expanded ePTFE fibers and six UHMWPE fibers.

7. A method as defined in claim 4 wherein the braid has a pick count of 16.5 picks/cm.

8. A method as defined in claim 1 wherein said fishing line has a break force subsequent to abrasion testing of at least 40% of the break force prior to abrasion testing.

9. A method as defined in claim 1 wherein said fishing line has a break force subsequent to abrasion testing of at least 50% of the break force prior to abrasion testing.

10. A method as defined in claim 1 wherein said fishing line has a break force subsequent to abrasion testing of at least 60% of the break force prior to abrasion testing.

11. A method as defined in claim 1 wherein the ratio of the number of said fluoropolymer fibers to the total number of fibers is 12.5%.

12. A method as defined in claim 1 wherein the ratio of the number of said fluoropolymer fibers to the total number of fibers is 25%.

13. A method as defined in claim 1 wherein said fishing line has a tenacity of at least 10 g/d.

14. A method as defined in claim 1 wherein said fishing line has a tenacity of at least 15 g/d.

15. A method as defined in claim 1 wherein said fishing line has a tenacity of at least 20 g/d.

16. A method as defined in claim 1 wherein said fishing line has a break force of at least 13 kg subsequent to abrasion testing.

17. A method as defined in claim 1 wherein said fishing line has a break force of at least 14.5 kg subsequent to abrasion testing.

18. A method as defined in claim 1 wherein said fishing line has a break force of at least 16 kg subsequent to abrasion testing.

* * * * *